(12) United States Patent
Miyazaki

(10) Patent No.: US 8,530,575 B2
(45) Date of Patent: Sep. 10, 2013

(54) TIRE

(75) Inventor: Tatsuya Miyazaki, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 650 days.

(21) Appl. No.: 12/503,691

(22) Filed: Jul. 15, 2009

(65) Prior Publication Data

US 2010/0032071 A1 Feb. 11, 2010

(30) Foreign Application Priority Data

Aug. 7, 2008 (JP) ................... 2008-204590

(51) Int. Cl.
*B60C 1/00* (2006.01)
*B60C 9/00* (2006.01)
*C08K 3/04* (2006.01)
*C08G 73/10* (2006.01)

(52) U.S. Cl.
USPC ........... 524/847; 152/451; 152/525; 152/564; 524/495; 524/496

(58) Field of Classification Search
USPC ............... 152/451, 525, 564; 544/495, 496; 524/495, 496, 847
See application file for complete search history.

(56) References Cited

U.S. PATENT DOCUMENTS

| | | | |
|---|---|---|---|
| 5,327,713 A * | 7/1994 | Sakon .......................... | 57/213 |
| 5,410,868 A * | 5/1995 | Sakon .......................... | 57/213 |
| 5,472,033 A * | 12/1995 | Kawamura et al. .......... | 152/527 |
| 6,196,289 B1 * | 3/2001 | Yoshioka ...................... | 152/517 |
| 7,156,138 B2 * | 1/2007 | Suzuki ......................... | 152/526 |
| 2004/0123931 A1 * | 7/2004 | Hanya .......................... | 152/564 |
| 2005/0197445 A1 * | 9/2005 | Mizuno ........................ | 524/492 |
| 2005/0205190 A1 * | 9/2005 | Suzuki ......................... | 152/537 |
| 2005/0205191 A1 * | 9/2005 | Suzuki ......................... | 152/537 |
| 2005/0209393 A1 * | 9/2005 | Hochi .......................... | 524/496 |
| 2005/0211362 A1 * | 9/2005 | Hirayama .................... | 152/547 |
| 2006/0047056 A1 * | 3/2006 | Miyazaki .................... | 524/495 |
| 2006/0102269 A1 * | 5/2006 | Uchida et al. ................ | 152/532 |
| 2006/0180259 A1 * | 8/2006 | Kajita .......................... | 152/541 |
| 2007/0113946 A1 * | 5/2007 | Manno et al. ................ | 152/531 |
| 2007/0131334 A1 * | 6/2007 | Miyazaki .................... | 152/556 |
| 2007/0232737 A1 * | 10/2007 | Miyazaki .................... | 524/435 |
| 2008/0009570 A1 * | 1/2008 | Miyazaki ...................... | 524/89 |
| 2009/0169883 A1 * | 7/2009 | Kunisawa .................... | 428/390 |

FOREIGN PATENT DOCUMENTS

| | | |
|---|---|---|
| EP | 1630000 A2 | 3/2006 |
| EP | 1876203 A2 | 1/2008 |
| JP | 63-218746 A | 9/1988 |
| JP | 5-320421 A | 12/1993 |
| JP | 2004-284375 A | 10/2004 |
| JP | 2006-137806 A | 6/2006 |
| JP | 2007-161819 A | 6/2007 |
| JP | 2007161819 * | 6/2007 |
| JP | 2008-24913 A | 2/2008 |
| WO | WO-2007113994 * | 10/2007 |

OTHER PUBLICATIONS

Machine language translation of JP 2007161819.*
Science and Technology of Rubber, 1994.*

* cited by examiner

*Primary Examiner* — William Cheung
(74) *Attorney, Agent, or Firm* — Birch, Stewart, Kolasch & Birch, LLP

(57) ABSTRACT

A tire satisfying both of the low rolling resistance of the tire and the improvement of tire strength is provided. A tire including sidewall including a rubber composition for sidewall including a rubber composition including a rubber component including 35 to 65% by mass of NR and/or IR, 15 to 55% by mass of a modified BR and 0 to 50% by mass of other rubber and 20 to 40 parts by mass of filler, in which complex elastic modulus E* is 2.0 to 3.5 MPa and tan δ is less than 0.12; case in which cord is covered with a rubber composition for covering case cord including a rubber component including 50 to 80% by mass of NR and/or IR, 20 to 45% by mass of diene rubber of a modified SBR, a modified BR or ENR and 0 to 30% by mass of other rubber and 20 to 40 parts by mass of filler, in which E* is 2.0 to 3.5 MPa and tan δ is less than 0.12; and clinch including a rubber composition for clinch including a rubber component including 30 to 50% by mass of NR and/or IR, 15 to 70% by mass of a modified BR and 0 to 55% by mass of other rubber and 35 to 80 parts by mass of filler, in which E* is 4.5 to 9.0 MPa and tan δ is less than 0.12.

4 Claims, No Drawings

TIRE

This U.S. Patent application claims benefits of Japan Patent Application No. 2008-204590 filed Aug. 7, 2008.

BACKGROUND OF THE INVENTION

The present invention relates to a tire satisfying both of the reduction of rolling resistance and the improvement of strength of the tire.

The low fuel cost of a car has been conventionally carried out by the reduction of the rolling resistance of a tire (improvement of the rolling resistance performance). Request for the low fuel cost of a car has been recently strengthened increasingly and more superior low heat build-up property is requested. For example, as a method of reducing the rolling resistance of a tire, there is carried out a method of reducing the loss tangent tan δ of tread, sidewall, breaker rubber and clinch in order in which rubbers used are much.

As trial of reducing the rolling resistance of tire member, for example, it is described in the patent literature 1 that a butadiene rubber modified with tin is used for a rubber composition for sidewall as a rubber component, and it is described in the patent literature 2 that a styrene-butadiene rubber modified with solution polymerization and/or a butadiene rubber modified with tin is used as the rubber component of a rubber composition for covering carcass.

As a method of reducing the loss tangent tan δ of a sidewall rubber, there are mentioned a method of reducing the compounding amount of filler, a method of enlarging the particle diameter of carbon black and a method of compounding a modified butadiene rubber, but elongation at break is lowered. Further, as a method of reducing the loss tangent tan δ of a clinch rubber, there are also mentioned a method of reducing the compounding amount of filler, a method of enlarging the particle diameter of carbon black and a method of compounding a modified butadiene rubber, but elongation at break is also lowered; therefore it provokes damage by stone curb and damage at assembling rim and further, causes the friction of rim chafing.

Namely, it is difficult to satisfy both of the reduction of rolling resistance and the improvement of elongation at break and there was no tire having low rolling resistance and superior strength.

[Patent literature 1] Japanese Unexamined Patent Publication No. 5-320421

[Patent literature 2] Japanese Unexamined Patent Publication No. 2007-161819

SUMMARY OF THE INVENTION

It is the purpose of the present invention to provide a tire satisfying both of the low rolling resistance of the tire and the improvement of tire strength.

The present invention relates to a tire having sidewall, case and clinch, wherein the sidewall comprises (A) a rubber composition for sidewall comprising (A1) a rubber component comprising (a1) 35 to 65% by mass of a natural rubber and/or an isoprene rubber, (a2) 15 to 55% by mass of a modified butadiene rubber and (a3) 0 to 50% by mass of other rubber, and (A2) 20 to 40 parts by mass of filler based on 100 parts by mass of the rubber component (A1), in which complex elastic modulus E* measured at 70° C. is 2.0 to 3.5 MPa and loss tangent tan δ is less than 0.12; case cord is covered with (B) a rubber composition for covering case cord comprising (B1) a rubber component comprising (b1) 50 to 80% by mass of a natural rubber and/or an isoprene rubber, (b2) 20 to 45% by mass of at least one diene rubber selected from a group consisting of a modified styrene-butadiene rubber, a modified butadiene rubber and an epoxidized natural rubber and (b3) 0 to 30% by mass of other rubber and (B2) 20 to 40 parts by mass of filler based on 100 parts by mass of the rubber component (B1), in which complex elastic modulus E* measured at 70° C. is 2.0 to 3.5 MPa and loss tangent tan δ is less than 0.12; and the clinch comprises (C) a rubber composition for clinch comprising (C1) a rubber component comprising (c1) 30 to 50% by mass of a natural rubber and/or an isoprene rubber, (c2) 15 to 70% by mass of a modified butadiene rubber and (c3) 0 to 55% by mass of other rubber, and (C2) 35 to 80 parts by mass of filler based on 100 parts by mass of the rubber component (C1), in which complex elastic modulus E* measured at 70° C. is 4.5 to 9.0 MPa and loss tangent tan δ is less than 0.12.

A natural rubber as (a1), a tin-modified butadiene rubber as (a2), and carbon black in which nitrogen adsorption specific surface area ($N_2SA$) is less than 45 $m^2/g$, as (A2) are preferably included in (A) the rubber composition for sidewall.

A natural rubber as (b1), a modified styrene-butadiene rubber as (b2), and carbon black and silica as (B2) are preferably included in (B) the rubber composition for covering case cord.

A natural rubber as (c1), a tin-modified butadiene rubber as (c2), a butadiene rubber comprising syndiotactic crystals as (c3), and carbon black in which nitrogen adsorption specific surface area ($N_2SA$) is at least 45 $m^2/g$ and silica in which nitrogen adsorption specific surface area ($N_2SA$) is at least 40 $m^2/g$, as (C2) are preferably included in (C) the rubber composition for clinch.

DETAILED DESCRIPTION

The tire of the present invention has sidewall comprising (A) a rubber composition for sidewall having specified composition and property, case covering cord with (B) a rubber composition for covering case cord having specified composition and property, and clinch including (C) a rubber composition for clinch having specified composition and property. Respective portion is illustrated below.

(A) Rubber Composition for Sidewall

The rubber composition for sidewall (A) of the present invention includes a specific rubber component (A1) and filler (A2).

The rubber component (A1) includes a natural rubber (NR) and/or an isoprene rubber (IR) (a1) as well as a modified butadiene rubber (modified BR) (a2).

NR is not specifically limited, those generally used in the rubber industry can be used and RSS#3 and TSR20 are specifically used.

Further, IR is not specifically limited and those conventionally used in the tire industry can be used.

The content of NR and/or IR (a1) in the rubber component (A1) is at least 35% by mass and preferably at least 40% by mass because elongation at break is superior. Further, the content of NR and/or IR (a1) in the rubber component (A1) is at most 65% by mass and preferably at most 60% by mass because the adequate amount of the modified BR superior in crack resistance is compounded.

The modified BR modifies chemically the terminal of a butadiene rubber and enhances bonding force between polymer and carbon black, and tin-modified BR and S-modified BR can be preferably exemplified.

As for the rubber composition for sidewall among these modified BR's, there is preferably tin-modified BR that is obtained by polymerizing 1,3-butadiene with a lithium initiator and then adding a tin compound and in which the terminal of the modified BR molecule is bonded with a tin-carbon bond.

The lithium initiator includes lithium compounds such as an alkyl lithium, aryl lithium, vinyl lithium, organic tin lithium and organic nitrogen lithium compound, and lithium metal. The modified BR with high vinyl and low cis content can be prepared by using the lithium initiator as the initiator of the modified BR.

The tin compound includes tin tetrachloride, butyltin trichloride, dibutyltin dichloride, dioctyltin dichloride, tributyltin chloride, triphenyltin chloride, diphenyldibutyltin, triphenyltin ethoxide, diphenyldimethyltin, ditolyltin chloride, diphenyltin dioctanoate, divinyldiethyltin, tetrabenzyltin, dibutyltin di-stearate, tetraallyltin and p-tributyltin styrene. These tin compounds may be used alone and at least two kinds may be used in combination.

The content of a tin atom in the modified BR is preferably at least 50 ppm and more preferably at least 60 ppm. When the content of a tin atom is less than 50 ppm, effect for promoting the dispersion of carbon black in the modified BR tends to be little and tan δ tends to be increased. Further, the content of a tin atom is preferably at most 3000 ppm, more preferably at most 2500 ppm and further preferably at most 250 ppm. When the content of a tin atom exceeds 3000 ppm, the cohesiveness of a kneaded article tends to be inferior and edges tend to be not arranged; therefore the extrusion property of the kneaded article tends to be deteriorated.

The molecular weight distribution (Mw/Mn) of the tin-modified BR is preferably at most 2 and more preferably at most 1.5. When Mw/Mn of the tin-modified BR exceeds 2, the dispersibility of carbon black is deteriorated and tan δ tends to be increased.

The amount of a vinyl bond of the tin-modified BR is preferably at least 5% by mass and more preferably at least 7% by mass. When the amount of a vinyl bond of the tin-modified BR is less than 5% by mass, it tends to be difficult to polymerize (produce) the modified BR. Further, the amount of a vinyl bond is preferably at most 50% by mass and more preferably at most 20% by mass. When the amount of a vinyl bond of the tin-modified BR exceeds 50% by mass, the dispersibility of carbon black tends to be deteriorated and tensile strength tends to be lowered.

As the tin-modified BR satisfying condition above, for example, BR1250H manufactured by Zeon Corporation is mentioned.

The S-modified butadiene rubber is a product obtained by modifying polybutadiene and is different from a modified styrene-butadiene rubber (modified SBR) obtained by modifying a styrene-butadiene rubber described later.

S-modified BR includes, for example, S-modified BR manufactured by Sumitomo Chemical Co., Ltd.

The content of the modified BR (a2) in the rubber component (A1) is at least 15% by mass and preferably at least 20% by mass because tan δ can be reduced. The content of the modified BR (a2) in the rubber component (A1) is at most 55% by mass and preferably at most 50% by mass because heat build-up at extrusion process can be suppressed and effect of reducing tan δ is saturated even if excessive amount is compounded.

Further, as other rubber (a3), a butadiene including syndiotactic crystals (VCR), an epoxidized natural rubber (ENR) and a modified SBR may be compounded in the rubber component (A1).

Herein, syndiotactic crystals mean, for example, syndiotactic-1,2-polybutadiene fiber. Crosslink density can be lessened by including VCR even if same complex elastic modulus E* is obtained, and strength, durability, abrasion resistance and crack growth property can be improved.

The content of the syndiotactic crystals of VCR is preferably 1 to 25% by mass and more preferably 5 to 20% by mass. When it is less than 1% by mass, syndiotactic component is too little and adequate rigidity does not tend to be obtained, and when it exceeds 25% by mass, durability is lowered because the syndiotactic component forms aggregation lump in polybutadiene. The VCR includes VCR-303, 412 and 617 manufactured by Ube Industries Ltd.

When VCR is compounded as other rubber (a3), at most 50% by mass and further, at most 45% by mass are preferable in the rubber component (A1) because heat build-up property is good. Further, at least 10% by mass and further, at least 15% by mass are preferable because abrasion resistance and E* is good.

Commercially available ENR may be used as ENR and NR may be epoxidized to be used. A process of epoxidizing NR is not specifically limited and it can be carried out using processes such as chlorohydrin process, direct oxidation process, hydrogen peroxide process, alkylhydroperoxide process and peracid process. As the peracid process, for example, a process of reacting organic peracid such as peracetic acid and performic acid with NR is mentioned.

The epoxidization ratio of ENR is preferably at least 10% by mol and more preferably at least 20% by mol. When the epoxidization ratio of ENR is less than 10% by mol, reversion tends to be great and crack growth resistance tends to be lowered. Further, the epoxidization ratio of ENR is preferably at most 60% by mol and more preferably 55% by mol. When the epoxidization ratio of ENR exceeds 60% by mol, processability such as mixed compound and sheet processability tends to be lowered.

ENR satisfying the condition is not specifically limited, but includes specifically ENR 25 and ENR 50 (Kumplan Guthrie Berhad). ENR may be used alone and at least two kinds may be used in combination.

When ENR is compounded as other rubber (a3) in the rubber component (A1), its content is preferably at least 15% by mass and more preferably at least 20% by mass because crack growth resistance is superior. Further, the content of ENR in the rubber component (A1) is at most 50% by mass and preferably at most 45% by mass because elongation at break is superior.

Example of the filler (A2) includes carbon black, silica and calcium carbonate and these may be used alone and at least two kinds may be used in combination. Among them, carbon black is preferably used because elongation at break, ozone resistance and weatherability is superior.

The compounding amount of the filler (A2) is at least 20 parts by mass, based on 100 parts by mass of the rubber component (A1), and preferably at least 23 parts by mass because elongation at break, sheet processability and extrusion processability are superior. Further, the compounding amount of the filler (A2) is at most 45 parts by mass, based on 100 parts by mass of the rubber component (A1), and preferably at most 40 parts by mass because tan δ can be reduced.

The nitrogen adsorption specific surface area ($N_2SA$) of lo carbon black is preferably at least 20 $m^2/g$ and more preferably at least 30 $m^2/g$ because elongation at break and processability are superior. As carbon black, $N_2SA$ is preferably less than 45 $m^2/g$ and more preferably less than 42 $m^2/g$ because tan δ can be reduced. Preferable carbon black includes, for example, N550 and N660.

Silica may be used in combination with carbon black. In case of use in combination, when silica is about 25 to 50 parts by mass based on 100 parts by mass of carbon black, processability to a sheet is improved and elongation at break is further improved.

The N$_2$SA of silica is preferably at least 40 m$^2$/g and more preferably at least 50 m$^2$/g because elongation at break is superior. Further, the N$_2$SA of silica is preferably at most 200 m$^2$/g and more preferably at most 180 m$^2$/g because effect of suppressing tan δ (low heat build-up) is superior.

Silica includes specifically Ultrasil VN3 available from Degussa Corporation, Z115GR available from Rhodia S. A. and Ultrasil 360 available from Degussa Corporation. When silica is used, a silane coupling agent may be used in combination. The silane coupling agent is described later.

The rubber composition for sidewall (A) in the present invention can suitably compound compounding agents generally used in the tire industry such as, for example, a vulcanizing agent such as sulfur, a vulcanization accelerator, zinc oxide, an antioxidant, aromatic oil, stearic acid and wax, in addition to the rubber component (A1) and filler (A2).

Complex elastic modulus E* measured at 70° C. is preferably at least 2.0 MPa, more preferably at least 2.5 MPa and further lo preferably at least 2.7 MPa because the rubber composition for sidewall (A) of the present invention is superior in elongation at break. Further, complex elastic modulus E* measured at 70° C. is preferably at most 3.5 MPa and more preferably at most 3.3 MPa because the rubber composition for sidewall (A) is easily bent and low in rolling resistance when a load is applied.

The lower the tan δ measured at 70° C. is, the more preferable the rubber composition (A) for sidewall of the present invention is, but the lower limit is usually 0.03. Further, loss tangent tan δ measured at 70° C. is preferably less than 0.12 and more preferably at most 0.11 because the rubber composition for sidewall (A) is low in tan δ and superior in low heat build-up and low rolling resistance.

Herein, the complex elastic modulus E* and loss tangent tan δ measured at 70° C. mean complex elastic modulus (E*) and loss tangent (tan δ) measured under the conditions of temperature of 70° C., frequency of 10 Hz, initial strain of 10% and dynamic strain of 2% with a viscoelastic spectrometer.

(B) Rubber Composition for Covering Case Cord

The rubber composition for covering case cord (B) used in the present invention includes the specific rubber component (B1) and filler (B2).

The rubber component (B1) includes (b1) a natural rubber (NR) and/or an isoprene rubber (IR), (b2) at least one diene rubber selected from a group consisting of a modified styrene-butadiene rubber (modified SBR), a modified butadiene rubber (modified BR) and an epoxidized natural rubber (ENR) and (b3) other rubber if necessary.

NR and IR (b1) are not specifically limited and NR and IR illustrated in the rubber composition for sidewall (A) can be preferably used.

The content of NR and/or IR (b1) in the rubber component (B1) is at least 50% by mass and preferably at least 55% by mass because elongation at break is superior. Further, it is at most 80% by mass and preferably at most 75% by mass because the adequate amount of the diene rubber (b2) superior in durability at high temperature (150 to 250° C.) and reversion property is compounded.

The diene rubber (b2) is at least one selected from a group consisting of a modified SBR, a modified BR and ENR.

The modified SBR is a polymer in which a modifying group having strong binding force with silica or carbon black is introduced in the polymer terminal of a styrene-butadiene polymer or in polymer chain.

As the modified SBR, those having a few amounts of bonded styrene such as HPR340 manufactured by JSR Co., Ltd. are preferable.

The amount of bonded styrene of the modified SBR is preferably at least 5% by mass and more preferably at least 7% by mass because reversion property at rubber compounding is superior. Further, the amount of bonded styrene of the modified SBR is preferably at most 30% by mass and more preferably at most 20% by mass because low heat build-up is superior.

The modified SBR includes a modified SBR by emulsion polymerization (modified E-SBR) and a modified SBR by solution polymerization (modified S-SBR), but the modified S-SBR is preferable because low fuel cost can be improved by strengthening bond between silica and polymer chain and reducing tan δ.

As the modified SBR, those coupled with tin and silicon are preferably used. As the coupling process of the modified SBR, there is mentioned a method of reacting alkali metal (such as Li) and alkali earth metal (such as Mg) at the molecular chain terminal of the modified SBR with tin halides and silicon halides.

The modified SBR is a (co)polymer obtained by (co)polymerizing conjugated diolefin alone or conjugated diolefin with an aromatic vinyl compound and has preferably a primary amino group and an alkoxysilyl group.

The primary amino group may be bonded with either of terminal at polymerization initiation, terminal at polymerization termination, polymer main chain and side chain, but it is preferably introduced in terminal at polymerization initiation or terminal at polymerization termination because energy loss from polymer terminal is suppressed and hysteresis loss property is improved.

The mass average molecular weight (Mw) of the modified SBR is preferably at least one million and more preferably at least 1.2 million because adequate fracture property is obtained. Further, the Mw of the modified SBR is preferably at most 2 million and more preferably at most 1.8 million because the viscosity of a rubber can be adjusted and kneading process can be easily carried out.

When the modified SBR is compounded as other rubber (b2) in the rubber component (B1), its content is at least 20% by mass and preferably at least 25% by mass because reversion property and durability is superior. Further, the content of the modified SBR in the rubber component (B1) is at most 45% by mass and preferably at most 40% by mass because the adequate amount of NR and/or IR superior in elongation at break is compounded.

As the modified BR, the modified BR illustrated in the rubber composition for sidewall (A) can be preferably used.

When the modified BR is used as the diene rubber (b2), its content in the rubber component (B1) is preferably at least 20% by mass and more preferably at least 25% by mass because crack growth resistance is superior and tan δ can be reduced. Further, it is preferably at most 45% by mass and more preferably at most 40% by mass because reversion property and elongation at break are superior.

Further, as the ENR, ENR illustrated in the rubber composition for sidewall (A) can be preferably used.

When ENR is compounded, its content in the rubber component (B1) is at least 20% by mass and preferably at least 30% by mass because reversion property is superior. Further, it is at most 45% by mass and preferably at most 40% by mass because elongation at break is superior.

Among these diene rubbers (b2), the modified SBR is preferable in particular because heat build-up and elongation at break are good.

The content of the diene rubbers (b2) in the rubber component (B1) is 20 to 45% by mass in the total of the contents of the diene rubbers (b2) in these rubber components (B1).

Example of the filler (B2) includes carbon black, silica and calcium carbonate and these may be used alone or at least two kinds may be used in combination. Among them, silica and/or carbon black are preferably used because elongation at break and tan δ can be reduced.

As silica and carbon black compounded in the rubber composition for covering case cord (B), silica and carbon black illustrated in the rubber composition for sidewall (A) can be preferably used.

The compounding amount of the filler (B2) is at least 20 parts by mass, based on 100 parts by mass of the rubber component (B1), and preferably at least 23 parts by mass because elongation at break is superior. Further, the compounding amount of the filler (B2) is at most 40 parts by mass, based on 100 parts by mass of the rubber component (B1), and preferably at most 35 parts by mass because tan δ can be reduced.

In the rubber composition for covering case cord (B), silica and carbon black are preferably used in combination as the filler (B2) because heat build-up and elongation at break are good. The mass ratio of silica to carbon black is preferably 10/1 to 1/1 and further, 5/1 to 2/1 because elongation at break (durability) is good.

When silica is used as the filler (B2), a silane coupling agent is preferably used in combination.

The silane coupling agent is not specifically limited, and those have been conventionally compounded in a rubber composition together with silica in the tire industry can be used. Specifically, there are mentioned sulfides series such as bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl)tetrasulfide, bis(4-trimethoxysilylbutyl)tetrasulfide, bis(3-triethoxysilylpropyl)trisulfide, bis(2-triethoxysilylethyl)trisulfide, bis(4-triethoxysilylbutyl)trisulfide, bis(3-trimethoxysilylpropyl)trisulfide, bis(2-trimethoxysilylethyl)trisulfide, bis(4-trimethoxysilylbutyl)trisulfide, bis(3-triethoxysilylpropyl)disulfide, bis(2-triethoxysilylethyl)disulfide, bis(4-triethoxysilylbutyl)disulfide, bis(3-trimethoxysilylpropyl)disulfide, bis(2-trimethoxysilylethyl)disulfide, bis(4-trimethoxysilylbutyl)disulfide, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 2-trimethoxysilylethyl-N,N-dimethylthiocarbamoyltetrasulfide, 3-trimethoxysilylpropylbenzothiazolyltetrasulfide, 3-triethoxysilylpropylbenzothiazoltetrasulfide, 3-triethoxysilylpropyl methacrylate monosulfide and 3-trimethoxysilylpropyl methacrylate monosulfide; mercapto series such as 3-mercaptopropyltrimethoxysilane, 3-mercaptopropyltriethoxysilane, 2-mercaptoethyltrimethoxysilane and 2-mercaptoethyltriethoxysilane; vinyl series such as vinyl triethoxysilane and vinyl trimethoxysilane;

amino series such as 3-aminopropyltriethoxysilane, 3-aminopropyltrimethoxysilane, 3-(2-aminoethyl)aminopropyltriethoxysilane, 3-(2-aminoethyl)aminopropyltriethoxysilane and 3-(2-aminoethyl)aminopropyltrimethoxysilane; glycidoxy series such as γ-glycidoxypropyltriethoxysilane, γ-glycidoxypropyltrimethoxysilane, γ-glycidoxypropylmethyldiethoxysilane and γ-glycidoxypropylmethyldimethoxysilane; nitro series such as 3-nitropropyltrimethoxysilane and 3-nitropropyltriethoxysilane; chloro series such as 3-chloropropyltrimethoxysilane, 3-chloropropyltriethoxysilane, 2-chloroethyltrimethoxysilane and 2-chloroethyltriethoxysilane. These silane coupling agents may be used alone or at least two kinds may be used in combination. Among them, bis(3-triethoxysilylpropyl)tetrasulfide and bis(3-triethoxysilylpropyl)disulfide are preferably used.

When the silane coupling agent is compounded, the content of the silane coupling agent is preferably at least 6 parts by mass, based on 100 parts by mass of silica, and more preferably at least 8 parts by mass because processability and heat build-up are superior. Further, the content of the silane coupling agent is preferably at most 12 parts by mass, based on 100 parts by mass of silica, and more preferably at most 10 parts by mass because when the silane coupling agent is excessively compounded, excessive coupling agent releases sulfur and the rubber is excessively cured; therefore elongation at break is lowered and cost is heightened.

The rubber composition for covering case cord (B) of the present invention can suitably compound compounding agents generally used in the tire industry such as, for example, a vulcanizing agent such as sulfur, a vulcanization accelerator, zinc oxide, an antioxidant, aromatic oil and stearic acid, in addition to the rubber component (B1) and filler (B2).

Complex elastic modulus E* measured at 70° C. is preferably at least 2.0 MPa, more preferably at least 2.5 MPa and further preferably at least 2.7 MPa because the rubber composition for covering case cord (B) of the present invention is superior in elongation at break. Further, complex elastic modulus E* measured at 70° C. is preferably at most 3.5 MPa and more preferably at most 3.2 MPa because the rubber composition for covering case cord (B) is superior in rolling resistance.

The lower the tan δ measured at 70° C. is, the more preferable the rubber composition for covering case cord (B) of the present invention is, but the lower limit is usually 0.03. Further, loss tangent tan δ measured at 70° C. is preferably less than 0.12 and more preferably at most 0.11 because the rubber composition for covering case cord (B) is superior in rolling resistance.

The case cord in the present invention may be either of case steel cord or case fiber cord.

The case steel cord means steel cord covered with the rubber composition for covering case (B), using the rubber composition for covering case cord (B) as a rubber for covering case cord.

Further, the case fiber cord means fiber cord covered with the rubber composition for covering case (B), using the rubber composition for covering case cord (B) as a rubber for covering case. Herein, the fiber cord is obtained by raw materials such as polyester, nylon, rayon, polyethylene terephthalate and aramid. Among them, polyester is preferably used as raw material because thermal stability is superior and further, cost is low.

(C) Rubber Composition for Clinch

The rubber composition for clinch (C) in the present invention includes NR and/or IR (c1), modified BR (c2), rubber component (C1) including other rubber (c3) and filler (C2).

Clinch in the present invention means the whole portion brought in contact with the rim of a tire and includes clinch apex, rubber chafer and bead toe.

NR and IR (c1) are not specifically limited and NR and IR illustrated in the rubber composition for sidewall (A) can be preferably used.

The content of NR and/or IR (c1) in the rubber component (C1) is at least 25% by mass, preferably at least 30% by mass and more preferably at least 32% by mass because elongation at break is superior. Further, it is at most 70% by mass, preferably at most 65% by mass and more preferably at most 50% by mass because the adequate amount of the modified BR (c2) superior in durability at high temperature (150 to 250° C.) and reversion property is compounded.

As the modified BR (c2), the modified BR illustrated in the rubber composition for sidewall (A) can be preferably used. As the modified BR (c2), tin-modified BR is preferable in particular because heat build-up is good.

The content of the modified BR (c2) in the rubber component (C1) is preferably at least 15% by mass, more preferably at least 35% by mass and further preferably at least 40% by mass because crack growth resistance is superior and tan δ can be reduced. Further, it is preferably at most 80% by mass and more preferably at most 75% by mass and further preferably at most 70% by mass because reversion property and elongation at break are superior.

The other rubber (c3) may be compounded till 55% by mass in the rubber component (C1), but as the other rubber, butadiene including syndiotactic crystals (VCR) can be used. Among them, VCR is preferable. As the VCR, VCR illustrated in the rubber composition for sidewall (A) can be preferably used.

When VCR is compounded as the other rubber (c3), at most 55% by mass and at most 50% by mass are preferable because heat build-up is good in the rubber component (C1). Further, at least 10% by mass and at least 15% by mass are preferable because abrasion resistance and E* are good.

Example of the filler (C2) includes carbon black, silica and calcium carbonate and these may be used alone or at least two kinds may be used in combination. Among them, silica and/or carbon black are preferably used because elongation at break and tan δ can be reduced.

As silica compounded in the rubber composition for clinch (C), silica illustrated in the rubber composition for sidewall (A) can be preferably used. Silica has action of retarding vulcanization speed and can adjust vulcanization speed by using in combination a vulcanization accelerator described later (for example, TACKIROL V200). When silica is used, a silane coupling agent may be optionally used in combination. As the silane coupling agent, those illustrated in the rubber composition for covering case cord (B) can be used.

Further, the nitrogen adsorption specific surface area ($N_2SA$) of carbon black is preferably at least 45 $m^2/g$ and more preferably at least 50 $m^2/g$ because abrasion resistance is superior. Further, $N_2SA$ is preferably at most 90 $m^2/g$ and more preferably at most 85 $m^2/g$ because low heat build-up can be attained. Preferable carbon black includes, for example, N330 and N351.

The compounding amount of the filler (C2) is at least 35 parts by mass, based on 100 parts by mass of the rubber component (C1), and preferably at least 37 parts by mass because abrasion resistance is superior. Further, it is at most 80 parts by mass, based on 100 parts by mass of the rubber component (C1), and preferably at most 70 parts by mass because tan δ can be reduced.

In the rubber composition for clinch (C), silica and carbon black are preferably used in combination as the filler (C2) because both of heat build-up and elongation at break are satisfied. The mass ratio of silica to carbon black is 0.10 to 0.30 and further, 0.15 to 0.27 because heat build-up, elongation at break and abrasion resistance are good.

The rubber composition for clinch (C) in the present invention can suitably compound compounding agents generally used in the tire industry such as, for example, a vulcanizing agent such as sulfur, a hybrid curing agent, a vulcanization accelerator, a vulcanization accelerating aid, zinc oxide, an antioxidant, aromatic oil and stearic acid, in addition to the rubber component (C1) and filler (C2).

As the vulcanization accelerating aid, a modified resorcinol condensate (or a modified cresol condensate) can be used and when same complex elastic modulus E* is provided, the modified resorcinol condensate is preferable because Hs (≈E*) can be heightened without increasing crosslinking points by a crosslinking agent (sulfur) and elongation at break EB is superior. Further, the modified resorcinol condensate is granule and reinforcing effect is also exhibited.

The modified resorcinol condensate includes, for example, a compound represented by the following formula:

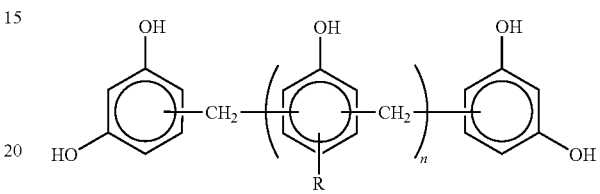

(Wherein n is integer and n is preferably an integer of 1 to 3. Further, R is an alkyl group having 1 to 3 carbons.) (For example, TACKIROL V200 manufactured by Taoka Chemical Co., Ltd.), a resorcinol-alkylphenol-formalin copolymer (SUMIKANOL 620 manufactured by Sumitomo Chemical Co., Ltd.) and a resorcinol-formaldehyde condensate (Penacolite Resin B-18-S and B-20 manufactured by INDSPEC Chemical Corporation).

Particularly preferable modified resorcinol condensate includes SUMIKANOL 620 and modified cresol condensate includes SUMIKANOL 610.

The content of the modified resorcinol condensate is at least 0.5 parts by mass, based on 100 parts by mass of the rubber component (C1), and preferably at least 0.8 parts by mass from the viewpoint of heat build-up. Further, it is at most 5 parts by mass and preferably at most 3 parts by mass because kneading processability is good.

A hybrid crosslinking agent may be compounded for suppressing reversion. The hybrid crosslinking agent includes, for example, HTS and PK900 manufactured by Flexsys Chemicals Sdn Bhd and KA 9188 manufactured by Bayer AG.

These modified resorcinol condensate and hybrid crosslinking agent can enhance complex elastic modulus E* and lessen loss tangent tan δ without forming ineffectual pendant crosslinking structure and branched crosslinking structure and without comparatively lowering elongation at break EB.

Further, when complex elastic modulus E* is too low in clinch, clinch rubber is excessively deformed by compression at the grounding deformation of a tire, and peeling between case and clinch is easily generated by its strain and heat build-up.

Complex elastic modulus E* measured at 70° C. is preferably at least 4.5 MPa and more preferably at least 4.8 MPa because the rubber composition for clinch in the present invention is superior in elongation at break. Further, complex elastic modulus E* measured at 70° C. is preferably at most 9.0 MPa and more preferably at most 8.0 MPa because rolling resistance is superior.

For the rubber composition for clinch (C) in the present invention, the lower the tan δ measured at 70° C. is preferably less than 0.12 and more preferably at most 0.11 because rolling resistance is low. The lower limit is usually 0.03.

The tire of the present invention is produced by a usual method using the rubber composition for sidewall (A) as sidewall, the rubber composition for covering case cord (B) as the covering of the cord of case and the rubber composition for clinch (C) as clinch. Namely, the rubber composition for sidewall (A) and the rubber composition for clinch (C) are extruded and processed in matching with the forms of the sidewall and clinch at unvulcanization stage, case cord is covered with the rubber composition for covering case cord (B) to mold case, and they are laminated with other tire members on a tire molding machine; thereby an unvulcanized tire is formed. The tire of the present invention can be produced by heating and pressurizing the unvulcanized tire in a vulcanizer.

Further, even if complex elastic modulus E* at sidewall portion is reduced, the influence of rolling resistance is little for a tire with high inner pressure (700 to 1000 kPa (7 to 10 kgf/cm$^2$)), but the bending of the sidewall portion of a tire, namely complex elastic modulus E* affects rolling resistance for a tire used at low inner pressure (at most 300 kPa); therefore the tire of the present invention can be preferably used as tires for an automobile and tires for a light truck that are used at low inner pressure (at most 300 kPa).

EXAMPLE

The present invention is specifically illustrated based on Examples, but the present invention is not limited only to these.

Various chemicals used in Examples and Comparative Examples are illustrated as a whole.
Natural rubber (NR): RSS#3
Tin-modified butadiene rubber (tin-modified BR): 1250H (tin-modified BR, lithium initiator: lithium, content of tin atom: 250 ppm, Mw/Mn: 1.5, vinyl bond quantity: 10 to 13% by mass) manufactured by ZEON Corporation
High cis BR: BR150B (weight average molecular weight: 5.0×10$^5$, molecular weight distribution: 3.3, high cis type (the quantity of 1,4-cis butadiene unit: 97% by weight) manufactured by Ube Industries Ltd.
Modified SBR: HPR 340 (modified styrene-butadiene rubber by solution polymerization (modified S-SBR): bonded styrene amount: 10% by mass, coupling was carried out with alkoxylsilane and introduced at terminal) manufactured by Japan Synthetic Rubber Co., Ltd.
Styrene-butadiene rubber by emulsion polymerization (E-SBR):
SBR1502 manufactured by Japan Synthetic Rubber Co., Ltd.
VCR: VCR412 manufactured by Ube Industries Ltd.
Carbon black 1: SHOWBLACK N550 (N$_2$SA: 41 m$^2$/g) available from CABBOT JAPAN LTD.
Carbon black 2: SEAST V (N660, N$_2$SA: 27 m$^2$/g) available from TOKAI CARBON CO. LTD.
Carbon black 3: SHOWBLACK N351H (N$_2$SA: 73 m$^2$/g) available from CABBOT JAPAN LTD.
Silica: Z115Gr (N$_2$SA: 112 m$^2$/g) available from RHODIA S.A.
Silane coupling agent: Si75 (bis(3-triethoxysilylpropyl)disulfide) available from Degussa Huls Co.
Zinc oxide: GINREI R available from Toho Zinc Co., Ltd.
Stearic acid: TSUBAKI available from NOF Corporation
Aromatic oil: PROCESS X-140 available from Japan Energy Co., Ltd.
Antioxidant: NOCRAC 6C (N-(1,3-dimethylbutyl)-N-phenyl-p-phenylenediamine) available from OUCHISHINKO CHEMICAL INDUSTRIAL CO., LTD.
Wax: SUNNOC WAX available from OUCHISHINKO CHEMICAL INDUSTRIAL CO., LTD.
Insoluble sulfur: SEIMISULFUR (insoluble sulfur by carbon disulfide: 60% and 10% of oil) manufactured by NIPPON KANRYU INDUSTRY CO., LTD.
Vulcanization accelerator CBS: NOCCELER CZ-G manufactured by TSURUMI CHEMICAL INDUSTRY CO., LTD.
Vulcanization accelerator HMT: NOCCELER H (hexamethylenetetramine) manufactured by OUCHISHINKO CHEMICAL INDUSTRIAL CO., LTD.
Vulcanization accelerator DPG: SOXINOL D manufactured by Sumitomo Chemical Co., Ltd.
Vulcanization accelerator TBBS: NOCCELER NS (N-t-butyl-2-benzothiazolyl sulfenamide) manufactured by OUCHISHINKO CHEMICAL INDUSTRIAL CO., LTD.
Vulcanization accelerating aid: SUMIKANOL 620 (resorcinol-alkylphenol-formalin copolymer) manufactured by Sumitomo Chemical Co., Ltd.

Production Examples 1 to 5 and Comparative Production Examples 1 to 6

Rubber Compositions for Sidewall

Chemicals excluding sulfur and a vulcanization accelerator were added according to the compounding prescription shown in Table 1 and kneaded under the condition of maximum temperature of 165° C. for 5 minutes using a Banbury mixer to obtain kneaded articles. Thereafter, sulfur and a vulcanization accelerator were added to the kneaded articles obtained, and the mixture was kneaded with a biaxial open roll under the condition of maximum temperature of 97° C. for 3 minutes to obtain unvulcanized rubber compositions for sidewall. The unvulcanized rubber compositions obtained were extruded and processed in the fixed form of tires and the vulcanized rubber sheets of Production Examples 1 to 5 (SWJ 1 to 5) and Comparative Production Examples 1 to 6 (SWH 1 to 6) were prepared by carrying out press curing under the condition of 170° C. for 12 minutes.

Extrusion processability was evaluated for these vulcanized rubber sheets and the following viscoelasticity test and tensile test were carried out. Results are shown in Table 1.
(Extrusion Processability)
State at extrusion process with the extruder was evaluated as ⊚: very good, ○: approval, Δ: disapproval (=countermeasure is required) and ×: not applicable.
(Viscoelasticity Test)
The complex elastic modulus (E*) and loss tangent (tan δ) of vulcanized rubber compositions was measured under the conditions of temperature of 70° C., a frequency of 10 Hz, an initial stain of 10% and a dynamic strain of 2% with a viscoelastic spectrometer VES manufactured by Iwamoto Seisakusyo K.K. It is indicated for the rubber compositions for sidewall, case and inner liner that the lower the E* is, the lower the rolling resistance is. It is indicted that the smaller the tan δ is, the more the rolling resistance is reduced and low fuel cost is superior.
(Tensile Test)
Vulcanized rubber test pieces with a fixed size were cut out from the vulcanized rubber compositions and elongation at break (EB) of respective compounding was measured according to JIS K 6251 "Vulcanized rubber and Thermoplastic rubber—Determination method of Tensile property". Further, it is indicated that the larger the EB is, the more the elongation at break and the crack growth after preparing crack are suppressed.

TABLE 1

| Rubber composition | Production Examples | | | | | Comparative Production Examples | | | | | |
|---|---|---|---|---|---|---|---|---|---|---|---|
| for sidewall | 1 | 2 | 3 | 4 | 5 | 1 | 2 | 3 | 4 | 5 | 6 |
| Rubber component (A1) | | | | | | | | | | | |
| (a1) NR | 60 | 60 | 60 | 60 | 60 | 60 | 60 | 60 | 60 | 60 | 60 |
| (a2) Tin-modified BR | 40 | 40 | 40 | 40 | 20 | 40 | — | 40 | 10 | — | 40 |
| (a3) VCR | — | — | — | — | 20 | — | — | — | — | — | — |
| High cis BR | — | — | — | — | — | — | 40 | — | 30 | 40 | — |
| Filler (A2) | | | | | | | | | | | |
| Carbon black 1 | 20 | 27 | — | 37 | 20 | 37 | 37 | 45 | 37 | — | 15 |
| Carbon black 2 | — | — | 20 | — | — | — | — | — | — | 20 | — |
| Silica | 7 | — | 7 | — | 7 | — | — | — | — | 7 | 7 |
| Zinc Oxide | 4 | 4 | 4 | 4 | 4 | 4 | 4 | 4 | 4 | 4 | 4 |
| Stearic acid | 2 | 2 | 2 | 2 | 2 | 2 | 2 | 2 | 2 | 2 | 2 |
| Antioxidant | 3 | 3 | 3 | 3 | 3 | 3 | 3 | 3 | 3 | 3 | 3 |
| Wax | 1 | 1 | 1 | 1 | 1 | 1 | 1 | 1 | 1 | 1 | 1 |
| Aromatic oil | 5 | 5 | 5 | 5 | 5 | 5 | 5 | 5 | 5 | 5 | 5 |
| Insoluble sulfur | 2.33 | 2.33 | 2.33 | 2.33 | 2.33 | 2.33 | 2.33 | 2.33 | 2.33 | 2.33 | 2.33 |
| Vulcanization accelerator CBS | 1.4 | 1.4 | 1.4 | 0.9 | 1.4 | 0.9 | 0.9 | 0.9 | 0.9 | 1.4 | 1.4 |
| Property | | | | | | | | | | | |
| Extrusion processability | ◯ | ◯ | ◯ | ◯ | ◉ | ◯ | ◯ | ◉ | ◯ | ◯ | X |
| Viscoelasticity | | | | | | | | | | | |
| E* (70° C.) | 2.5 | 2.9 | 2.2 | 3.4 | 2.7 | 3.7 | 3.9 | 4.3 | 3.8 | 2.2 | 1.9 |
| tan δ (70° C.) | 0.075 | 0.085 | 0.071 | 0.114 | 0.084 | 0.102 | 0.135 | 0.118 | 0.128 | 0.124 | 0.079 |
| EB (%) | 550 | 520 | 490 | 470 | 600 | 550 | 560 | 510 | 570 | 550 | 520 |
| Code of rubber composition | SWJ1 | SWJ2 | SWJ3 | SWJ4 | SWJ5 | SWH1 | SWH2 | SWH3 | SWH4 | SWH5 | SWH6 |

Production Examples 6 to 10 and Comparative Production Examples 7 to 12

Rubber Compositions for Covering Case Cord

Chemicals excluding sulfur and a vulcanization accelerator were added according to the compounding prescription shown in Table 2 and kneaded under the condition of maximum temperature of 165° C. for 5 minutes with a Banbury mixer to obtain kneaded articles. Thereafter, sulfur and a vulcanization accelerator were added to the kneaded articles obtained, and the mixture was kneaded with a biaxial open roll under the condition of maximum temperature of 97° C. for 3 minutes to obtain unvulcanized rubber compositions for covering case cord. Case cord (polyester cord available from Teijin Limited) was covered with the unvulcanized rubber compositions obtained and the vulcanized rubber sheets for covering case cord of Production Examples 6 to 10 (CAJ 1 to 5) and Comparative Production Examples 7 to 12 (CAH 1 to 6) were prepared by carrying out press vulcanization under the condition of 170° C. for 12 minutes.

Sheet processability was evaluated for these vulcanized rubber sheets for covering case cord. Results are shown in Table 2.

(Sheet Processability)

Surface state of the vulcanized rubber sheets for covering case cord was evaluated as ◉: very good, ◯: approval, Δ: disapproval (=countermeasure is required) and ×: not applicable.

Further, the vulcanized rubber compositions obtained were rolled in sheet shape with a mold, vulcanized rubber sheets for test were prepared by carrying out press vulcanization under the condition of 170° C. for 12 minutes and viscoelasticity test and tensile test were carried out in like manner as Production Example 1. Results are shown in Table 2.

TABLE 2

| Rubber composition | Production Examples | | | | | Comparative Production Examples | | | | | |
|---|---|---|---|---|---|---|---|---|---|---|---|
| for covering case cord | 6 | 7 | 8 | 9 | 10 | 7 | 8 | 9 | 10 | 11 | 12 |
| Rubber component (B1) | | | | | | | | | | | |
| (b1) NR | 70 | 70 | 70 | 70 | 60 | 70 | 70 | 70 | 70 | 70 | 70 |
| (b2) Tin-modified BR | — | — | — | — | 20 | — | — | — | — | — | — |
| Modified SBR | 30 | 30 | 30 | 30 | 20 | 30 | — | 30 | 10 | — | 30 |
| (b3) E-SBR | — | — | — | — | — | — | 30 | — | 20 | 30 | — |
| Filler (B2) | | | | | | | | | | | |
| Carbon black 1 | 5 | 5 | — | 5 | 5 | 5 | 5 | 10 | 5 | 5 | 5 |
| Carbon black 2 | — | — | 5 | — | — | — | — | — | — | 20 | — |
| Silica | 25 | 30 | 25 | 35 | 25 | 40 | 40 | 40 | 40 | 25 | 20 |
| Silane coupling agent | 2 | 2.4 | 2 | 2.8 | 2 | 3.2 | 3.2 | 3.2 | 3.2 | 2 | 1.6 |
| Zinc oxide | 4 | 4 | 4 | 4 | 4 | 4 | 4 | 4 | 4 | 4 | 4 |
| Stearic acid | 2 | 2 | 2 | 2 | 2 | 2 | 2 | 2 | 2 | 2 | 2 |
| Antioxidant | 1 | 1 | 1 | 1 | 1 | 1 | 1 | 1 | 1 | 1 | 1 |
| Aromatic oil | 5 | 5 | 9 | 5 | 5 | 5 | 5 | 5 | 5 | 5 | 5 |
| Insoluble sulfur | 3.0 | 3.0 | 3.0 | 3.0 | 3.0 | 3.0 | 3.0 | 3.0 | 3.0 | 3.0 | 3.0 |

TABLE 2-continued

| Rubber composition | Production Examples | | | | | Comparative Production Examples | | | | | |
|---|---|---|---|---|---|---|---|---|---|---|---|
| for covering case cord | 6 | 7 | 8 | 9 | 10 | 7 | 8 | 9 | 10 | 11 | 12 |
| Vulcanization accelerator CBS | 0.7 | 0.7 | 0.7 | 0.7 | 0.7 | 0.7 | 0.7 | 0.7 | 0.7 | 0.7 | 0.7 |
| Vulcanization accelerator DPG | 0.7 | 0.7 | 0.7 | 0.7 | 0.7 | 07 | 0.7 | 0.7 | 0.7 | 0.7 | 0.7 |
| Property | | | | | | | | | | | |
| Sheet processability | ○ | ◎ | ○ | ◎ | ○ | ◎ | ◎ | ◎ | ◎ | ○ | X |
| Viscoelasticity | | | | | | | | | | | |
| E* (70° C.) | 2.5 | 3.0 | 2.1 | 3.5 | 2.6 | 3.8 | 4.0 | 4.6 | 3.9 | 2.7 | 1.8 |
| tan δ (7° C.) | 0.095 | 0.108 | 0.096 | 0.118 | 0.092 | 0.128 | 0.155 | 0.137 | 0.142 | 0.127 | 0.095 |
| EB (%) | 550 | 570 | 520 | 550 | 570 | 560 | 600 | 530 | 590 | 590 | 520 |
| Code of rubber composition | CAJ1 | CAJ2 | CAJ3 | CAJ4 | CAJ5 | CAH1 | CAH2 | CAH3 | CAH4 | CAH5 | CAH6 |

Production Examples 11 to 15 and Comparative Production Examples 13 to 18

Rubber Compositions for Clinch

Chemicals excluding sulfur and a vulcanization accelerator were added according to the compounding prescription shown in Table 3 and kneaded under the condition of maximum temperature of 165° C. for 5 minutes with a Banbury mixer to obtain kneaded articles. Thereafter, sulfur and a vulcanization accelerator were added to the kneaded articles obtained, and the mixture was needed with a biaxial open roll under the condition of maximum temperature of 97° C. for 3 minutes to obtain unvulcanized rubber compositions for clinch. The unvulcanized rubber compositions obtained were rolled in sheet shape with a mold and the vulcanized rubber sheets of Production Examples 11 to 15 (CLJ 1 to 5) and Comparative Production Examples 13 to 18 (CLH 1 to 6) were prepared by carrying out press vulcanization under the condition of 170° C. for 12 minutes.

Viscoelasticity test and tensile test were carried out for these cured rubber sheets as in Production Example 1. Further, pico abrasion test was also carried out. Results are shown in Table 3.

(Rim Deviation)

The unvulcanized rubber compositions were molded in clinch shape and laminated with other tire members on a tire molding machine to form unvulcanized tires, and they were vulcanized by press under the conditions of 170° C. and 25 kgf/cm² for 15 minutes to produce truck tires (tire size: 225/70R16 117/115) for a commercial vehicle.

The tires were run on a drum at speed of 20 km/h under the condition of 230% load of maximum loading (maximum inner pressure condition) JIS specification for 600 hours, then the abrasion depth of rim flange contact portion was measured, the rim deviation index of Production Example 11 was referred to as 100, and the abrasion depths of respective compoundings were displayed with indices by the calculation formula below. Further, it is indicated that the larger the rim deviation index is, the more hardly the rim deviation occurs and it is preferable.

Rim deviation index=(Abrasion depth of Production Example 11)/(Abrasion depth of respective compounding)×100

TABLE 3

| Rubber composition | Production Examples | | | | | Comparative Production Examples | | | | | |
|---|---|---|---|---|---|---|---|---|---|---|---|
| for clinch | 11 | 12 | 13 | 14 | 15 | 13 | 14 | 15 | 16 | 17 | 18 |
| Rubber component (C1) | | | | | | | | | | | |
| (c1) NR | 35 | 35 | 35 | 35 | 35 | 35 | 35 | 35 | 35 | 35 | 35 |
| (c2) Tin-modified BR | 40 | 40 | 40 | 25 | 40 | 40 | — | — | 10 | — | 40 |
| (c3) VCR | 25 | 25 | 25 | 40 | 25 | 25 | 25 | 65 | 25 | 25 | 25 |
| High cis BR | — | — | — | — | — | — | 40 | — | 30 | 40 | — |
| Filler (C2) | | | | | | | | | | | |
| Carbon black 3 | 35 | 40 | 35 | 40 | 40 | 70 | 70 | 70 | 70 | 35 | 25 |
| Silica | 10 | 10 | 10 | 10 | 10 | — | — | — | — | 10 | 10 |
| Zinc oxide | 2 | 2 | 2 | 2 | 2 | 2 | 2 | 2 | 2 | 2 | 2 |
| Stearic acid | 2 | 2 | 2 | 2 | 2 | 2 | 2 | 2 | 2 | 2 | 2 |
| Antioxidant | 2 | 2 | 2 | 2 | 2 | 2 | 2 | 2 | 2 | 2 | 2 |
| Wax | 1 | 1 | 1 | 1 | 1 | 1 | 1 | 1 | 1 | 1 | 1 |
| Aromatic oil | 5 | 5 | 5 | 5 | 5 | 5 | 5 | 5 | 5 | 5 | 5 |
| Insoluble sulfur | 2.4 | 2.4 | 2.0 | 2.4 | 2.4 | 2.4 | 2.4 | 2.4 | 2.4 | 2.4 | 2.4 |
| Vulcanization accelerator TBBS | 2.8 | 2.8 | 2.8 | 2.8 | 2.8 | 2.8 | 2.8 | 2.8 | 2.8 | 2.8 | 2.8 |
| Vulcanization accelerator HMT | — | — | — | — | 0.3 | — | — | — | — | — | — |
| Vulcanization accelerating aid | — | — | — | — | 1 | — | — | — | — | — | — |
| Property | | | | | | | | | | | |
| Rim deviation test (index) | 100 | 107 | 101 | 112 | 109 | 96 | 98 | 112 | 97 | 99 | 82 |
| Viscoelasticity | | | | | | | | | | | |
| E* (70° C.) | 5.5 | 6.3 | 4.9 | 7.6 | 7.0 | 10.2 | 10.6 | 11.7 | 10.4 | 5.7 | 4.2 |
| tan δ (70° C.) | 0.102 | 0.112 | 0.102 | 0.118 | 0.113 | 0.142 | 0.179 | 0.192 | 0.165 | 0.134 | 0.091 |

TABLE 3-continued

| Rubber composition | Production Examples | | | | | Comparative Production Examples | | | | | |
|---|---|---|---|---|---|---|---|---|---|---|---|
| for clinch | 11 | 12 | 13 | 14 | 15 | 13 | 14 | 15 | 16 | 17 | 18 |
| EB (%) | 290 | 260 | 290 | 240 | 270 | 180 | 200 | 170 | 190 | 300 | 370 |
| Code of rubber composition | CLJ1 | CLJ2 | CLJ3 | CLJ4 | CLJ5 | CLH1 | CLH2 | CLH3 | CLH4 | CLH5 | CLH6 |

Examples 1 to 10 and Comparative Examples 1 to 10

The rubber compositions shown in Table 4 among the unvulcanized rubber compositions for sidewall respectively produced in Production Examples 1 to 5 and Comparative Production Examples 1 to 6 were molded in sidewall shape; cord (polyester cord available from Teijin Limited) was covered with the rubber compositions shown in Table 4 among the unvulcanized rubber compositions for covering case cord respectively produced in Production Examples 6 to 10 and Comparative Production Examples 7 to 12, to be molded in case shape; the unvulcanized rubber compositions for clinch respectively produced in Production Examples 10 to 15 and Comparative Production Examples 13 to 18 were molded in clinch shape; they were laminated with other tire members by the combination shown in Table 4; the unvulcanized tires of Examples 1 to 10 and Comparative Example 1 to 10 were respectively formed, and tires for test (size: 195/65R15 GTO65, tire for summer for an automobile) were produced by carrying out vulcanization by press under the condition of 170° C. for 12 minutes.

Rolling resistance and drum durability of these tires for test were determined by the following methods. The results of Examples are shown in Table 4 and the results of Comparative Example are shown in Table 5.

(Rolling Resistance)

The rolling resistance of the tires for test under the conditions of rim size (15×6JJ), tire inner pressure (200 kPa), load (4.41 kN) and speed (80 km/h) was measured with a rolling resistance tester. Further, the rolling resistance index of the tire of Comparative Example 1 was referred to as 100, and the rolling resistance of respective compoundings was displayed with indices by the calculation formula below. Further, it is indicated that the smaller the rolling resistance index is, the more the rolling resistance is reduced and rolling resistance performance is good.

(Rolling resistance index)=(Rolling resistance of respective compoundings)/(Rolling resistance of Comparative Example 1)×100

(Drum Durability Index)

The tires were run on a drum at speed of 20 km/h at the condition of 230% load which was the maximum loading (maximum inner pressure condition) of JIS specification, and the durability of the sidewall portion was tested. Running distance (running distance until the generation of swelling of the sidewall portion) until the fracture of interface between case cord and sidewall extends in a sidewall rubber and grows to separation was measured, the running distance of the tire in Comparative Example 1 was referred to as 100 and the running distances of respective compoundings were respectively displayed by indices (drum durability index) by the calculation formula below. The timing at which circular or semicircular swelling with a diameter of at least 5 cm was generated at the sidewall portion or broken holes were generated at the sidewall portion was referred to as the generation of the swelling of the sidewall portion. Further, it is indicated that the larger the drum durability index is, the more superior the durability of the sidewall portion is and it is good. In general, the larger the EB is and the smaller the tan δ is, the more hardly the separation is generated. Separation does not extend to the inner liner, but tan δ affects the temperature of the sidewall portion. The case, sidewall and clinch relates to durability. Loose does not extend in the clinch rubber itself, but when E* is appropriate and tan δ is small, fracture between the case cord and the sidewall is hardly generated.

(Drum durability index)=(Running distance of respective compoundings)/(Running distance of Comparative Example 1)×100

TABLE 4

| Tires for test | Examples | | | | | | | | | | Comparative Example 11 |
|---|---|---|---|---|---|---|---|---|---|---|---|
| | 1 | 2 | 3 | 4 | 5 | 6 | 7 | 8 | 9 | 10 | |
| Composition for sidewall (A) | SWJ1 | SWJ1 | SWJ1 | SWJ2 | SWJ4 | SWJ3 | SWJ1 | SWJ3 | SWJ1 | SWJ2 | SWJ3 |
| E* (70° C.) | 2.5 | 2.5 | 2.5 | 2.9 | 3.4 | 2.2 | 2.5 | 2.2 | 2.5 | 2.9 | 2.2 |
| tan δ (70° C.) | 0.075 | 0.075 | 0.075 | 0.085 | 0.114 | 0.071 | 0.075 | 0.071 | 0.075 | 0.085 | 0.071 |
| Composition for covering cord (B) | CAJ1 | CAJ1 | CAJ1 | CAJ2 | CAJ4 | CAJ3 | CAJ1 | CAJ3 | CAJ2 | CAJ1 | CAJ3 |
| E* (70° C.) | 2.5 | 2.5 | 2.5 | 3.0 | 3.5 | 2.1 | 2.5 | 2.1 | 3.0 | 2.5 | 2.1 |
| tan δ (70° C.) | 0.095 | 0.095 | 0.095 | 0.108 | 0.118 | 0.096 | 0.095 | 0.096 | 0.108 | 0.095 | 0.096 |
| Composition for clinch (C) | CLJ1 | CLJ2 | CLJ4 | CLJ1 | CLJ1 | CLJ1 | CLJ3 | CLJ3 | CLJ1 | CLJ1 | CLH6 |
| E* (70° C.) | 5.5 | 6.3 | 7.6 | 5.5 | 5.5 | 5.5 | 4.9 | 4.9 | 5.5 | 5.5 | 4.2 |
| tan δ (70° C.) | 0.102 | 0.112 | 0.118 | 0.102 | 0.102 | 0.102 | 0.102 | 0.102 | 0.102 | 0.102 | 0.091 |
| Property | | | | | | | | | | | |
| Rolling resistance (index) | 116 | 115 | 112 | 110 | 109 | 120 | 114 | 120 | 113 | 112 | 125 |
| Drum durability (index) | 150 | 155 | 135 | 130 | 125 | 140 | 125 | 120 | 135 | 140 | 102 |

TABLE 5

| Tires for test | Comparative Example | | | | | | | | | |
|---|---|---|---|---|---|---|---|---|---|---|
| | 1 | 2 | 3 | 4 | 5 | 6 | 7 | 8 | 9 | 10 |
| Composition for sidewall (A) | SWH1 | SWJ1 | SWJ1 | SWJ1 | SWH1 | SWH1 | SWH1 | SWH5 | SWJ1 | SWJ1 |
| E* (70° C.) | 3.7 | 2.5 | 2.5 | 2.5 | 3.7 | 3.7 | 3.7 | 2.2 | 2.5 | 2.5 |
| tan δ (70° C.) | 0.102 | 0.075 | 0.075 | 0.075 | 0.102 | 0.102 | 0.102 | 0.124 | 0.075 | 0.075 |
| Composition for covering case cord (B) | CAH1 | CAJ1 | CAJ1 | CAJ1 | CAH1 | CAH1 | CAH1 | CAH5 | CAH1 | CAH1 |
| E* (70° C.) | 3.8 | 2.5 | 2.5 | 2.5 | 3.8 | 3.8 | 3.8 | 2.7 | 3.8 | 3.8 |
| tan δ (70° C.) | 0.128 | 0.095 | 0.095 | 0.095 | 0.128 | 0.128 | 0.128 | 0.127 | 0.128 | 0.128 |
| Composition for clinch (C) | CLH1 | CLH1 | CLH3 | CLH5 | CLJ1 | CLJ4 | CLH5 | CLH1 | CLH1 | CLJ1 |
| E* (70° C.) | 10.2 | 10.2 | 11.7 | 5.7 | 5.5 | 7.6 | 5.7 | 10.2 | 10.2 | 5.5 |
| tan δ (70° C.) | 0.142 | 0.142 | 0.192 | 0.134 | 0.102 | 0.118 | 0.134 | 0.142 | 0.142 | 0.102 |
| Property | | | | | | | | | | |
| Rolling resistance (index) | 100 | 112 | 110 | 111 | 102 | 101 | 98 | 106 | 108 | 110 |
| Drum durability (index) | 100 | 95 | 90 | 108 | 101 | 105 | 80 | 105 | 105 | 120 |

It can be grasped from Tables 4 to 5 that Examples satisfy both of durability and rolling resistance and achieve step-up.

According to the present invention, a tire satisfying both of the low rolling resistance of the tire and the improvement of tire strength can be provided by combining sidewall, case and clinch comprising a fixed rubber composition to prepare a tire.

What is claimed is:

1. A tire having sidewall, case and clinch, wherein
the sidewall comprises (A) a rubber composition for sidewall comprising (A1) a rubber component comprising (a1) 35 to 65% by mass of a natural rubber and/or an isoprene rubber, (a2) 15 to 55% by mass of a modified butadiene rubber and (a3) 0 to 50% by mass of other rubber, and (A2) 20 to 40 parts by mass of filler based on 100 parts by mass of the rubber component (A1), in which complex elastic modulus E* measured at 70° C. is 2.0 to 3.5 MPa and loss tangent tan δ is less than 0.12,
case cord is covered with (B) a rubber composition for covering case cord comprising (B1) a rubber component comprising (b 1) 50 to 80% by mass of a natural rubber and/or an isoprene rubber, (b2) 20 to 45% by mass of at least one diene rubber selected from a group comprising a modified styrene-butadiene rubber, a modified butadiene rubber and an epoxidized natural rubber and (b3) 0 to 30% by mass of other rubber, and (B2) 20 to 40 parts by mass of a filler, based on 100 parts by mass of the rubber component (B1), in which complex elastic modulus E* measured at 70° C. is 2.0 to 3.5 MPa and loss tangent tan δ is less than 0.12, wherein the filler (B2) is a combination of silica and carbon black, in which carbon black has a nitrogen adsorption specific surface area ($N_2SA$) of 20 to 45 $m^2/g$, and the mass ratio of silica to carbon black is 10/1 to 1/1, and
the clinch comprises (C) a rubber composition for clinch comprising (C1) a rubber component comprising (c1) 30 to 50% by mass of a natural rubber and/or an isoprene rubber, (c2) 15 to 70% by mass of a modified butadiene rubber and (c3) 0 to 55% by mass of other rubber, and (C2) 35 to 80 parts by mass of filler based on 100 parts by mass of the rubber component (C1), in which complex elastic modulus E* measured at 70° C. is 4.5 to 9.0 MPa and loss tangent tan δ is less than 0.12.

2. The tire of claim 1, comprising a natural rubber as (a1), a tin-modified butadiene rubber as (a2), and carbon black in which nitrogen adsorption specific surface area ($N_2SA$) is less than 45 $m^2/g$, as (A2) in (A) the rubber composition for sidewall.

3. The tire of claim 1, comprising a natural rubber as (b1), and a modified styrene-butadiene rubber as (b2) in (B) the rubber composition for covering case cord.

4. The tire of claim 1, comprising a natural rubber as (c1), a modified butadiene rubber as (c2), a butadiene rubber comprising syndiotactic crystals as (c3), and carbon black in which nitrogen adsorption specific surface area ($N_2SA$) is at least 45 $m^2/g$ and silica in which nitrogen adsorption specific surface area ($N_2SA$) is at least 40 $m^2/g$, as (C2), in (C) the rubber composition for clinch.

* * * * *